(12) United States Patent
Zhan et al.

(10) Patent No.: US 11,452,403 B2
(45) Date of Patent: Sep. 27, 2022

(54) GRILL DEVICE

(71) Applicant: TSANN KUEN (ZHANGZHOU) ENTERPRISE CO., LTD., Fujian (CN)

(72) Inventors: Yixin Zhan, Fujian (CN); Wenyu Chang, Fujian (CN); Chunyu Wu, Fujian (CN)

(73) Assignee: TSANN KUEN (ZHANGZHOU) ENTERPRISE CO., LTD., Fujian (CN)

( * ) Notice: Subject to any disclaimer, the term of this patent is extended or adjusted under 35 U.S.C. 154(b) by 320 days.

(21) Appl. No.: 16/847,478

(22) Filed: Apr. 13, 2020

(65) Prior Publication Data
US 2020/0329907 A1 Oct. 22, 2020

(30) Foreign Application Priority Data

Apr. 17, 2019 (CN) .......................... 201910307548.3

(51) Int. Cl.
*A47J 37/06* (2006.01)
(52) U.S. Cl.
CPC .................................. *A47J 37/0611* (2013.01)
(58) Field of Classification Search
CPC .. A47J 37/0611; A47J 37/0629; A47J 37/015; A47J 37/0664; A47J 37/105; A47J 37/108; A47J 37/041
See application file for complete search history.

(56) References Cited

U.S. PATENT DOCUMENTS

| 2,116,688 | A | 5/1938 | Karl | |
|---|---|---|---|---|
| 2002/0153366 | A1* | 10/2002 | Glucksman | .......... A47J 37/0611 |
| | | | | 219/450.1 |
| 2010/0024662 | A1* | 2/2010 | Bengtson | ............. A47J 37/0611 |
| | | | | 99/377 |
| 2010/0199858 | A1 | 8/2010 | Chang | |
| 2016/0213197 | A1* | 7/2016 | Zhan | .................... A47J 37/0611 |

FOREIGN PATENT DOCUMENTS

| CN | 101171934 A | 5/2008 |
|---|---|---|
| CN | 201398883 Y | 2/2010 |
| CN | 105981751 A | 10/2016 |

OTHER PUBLICATIONS

Search Report appended to an Office Action, which was issued to Chinese counterpart Application No. 2019103075483 by the CNIPA dated Apr. 1, 2022, with an English translation thereof.

\* cited by examiner

*Primary Examiner* — Robert G Bachner
(74) *Attorney, Agent, or Firm* — DLA Piper LLP (US)

(57) ABSTRACT

A grill device includes a support rack and a grill module. The grill module is formed with a feed inlet, includes upper and lower grill plates, is rotatably mounted on the support rack about an axis, and is rotatable between an inclined position, where the feed inlet and a gravity center of the grill module are respectively located at two sides of the axis, where the gravity center is lower than the axis, and where the upper grill plate covers and is locked on the lower grill plate by the support rack, and a hand-held position, where the upper grill plate is unlocked from the support rack and is rotatable relative to the lower grill plate so as to uncover the lower grill plate.

9 Claims, 7 Drawing Sheets

GRILL DEVICE

CROSS-REFERENCE TO RELATED APPLICATION

This application claims priority of Chinese Invention Patent Application No. 201910307548.3, filed on Apr. 17, 2019.

FIELD

The disclosure relates to a grill device, more particularly to an electro-thermic grill device.

BACKGROUND

A conventional grill device for making a waffle includes a support rack, a grill mounted on the support rack, and a clamping module. The grill module includes a lower grill plate and an upper grill plate stacked on the lower grill plate to define a cooking space. Furthermore, the clamping module is mounted between the upper and lower grill plates.

During cooking operation, when a food material, such as an uncooked batter, is poured into the cooking space, the clamping module is operated to secure the upper and lower grill plates together so as to prevent the food material from flowing out of the cooking space due to swelling of the food material.

However, when a user of the grill device forgets to secure the clamping module or operates the clamping module improperly, the food material may still flow out of the cooking space. Further, the clamping module may increase manufacturing costs of the grill device. Additionally, excess batter resulting from improper operation to the clamping module may drip down from the conventional grill device and need to be removed for sanitary purpose.

SUMMARY

Therefore, an object of the disclosure is to provide a grill device that can alleviate at least one of the drawbacks of the prior art.

According to one aspect of the disclosure, a grill device adapted for cooking a food material is provided. The grill device includes a support rack and a grill module. The grill module is mounted rotatably on the support rack about a rotating axis, is formed with a feed inlet which is provided to fed the food material, and includes a lower grill plate and an upper grill plate. The upper grill plate is operable to cover and uncover the lower grill plate. The grill module is rotatable relative to the support rack between a natural inclined position and a hand-held position. When the grill module is at the natural inclined position, the feeding opening and a gravity center of the grill module are respectively located at two sides of the rotating axis, the gravity center is lower than the rotating axis in height, and the upper grill plate is locked on the lower grill plate by the support rack so as to cover the lower grill plate. When the grill module is at the hand-held position, the upper grill plate is unlocked from the support rack and is rotatable relative to the lower grill plate so as to uncover the lower grill plate.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
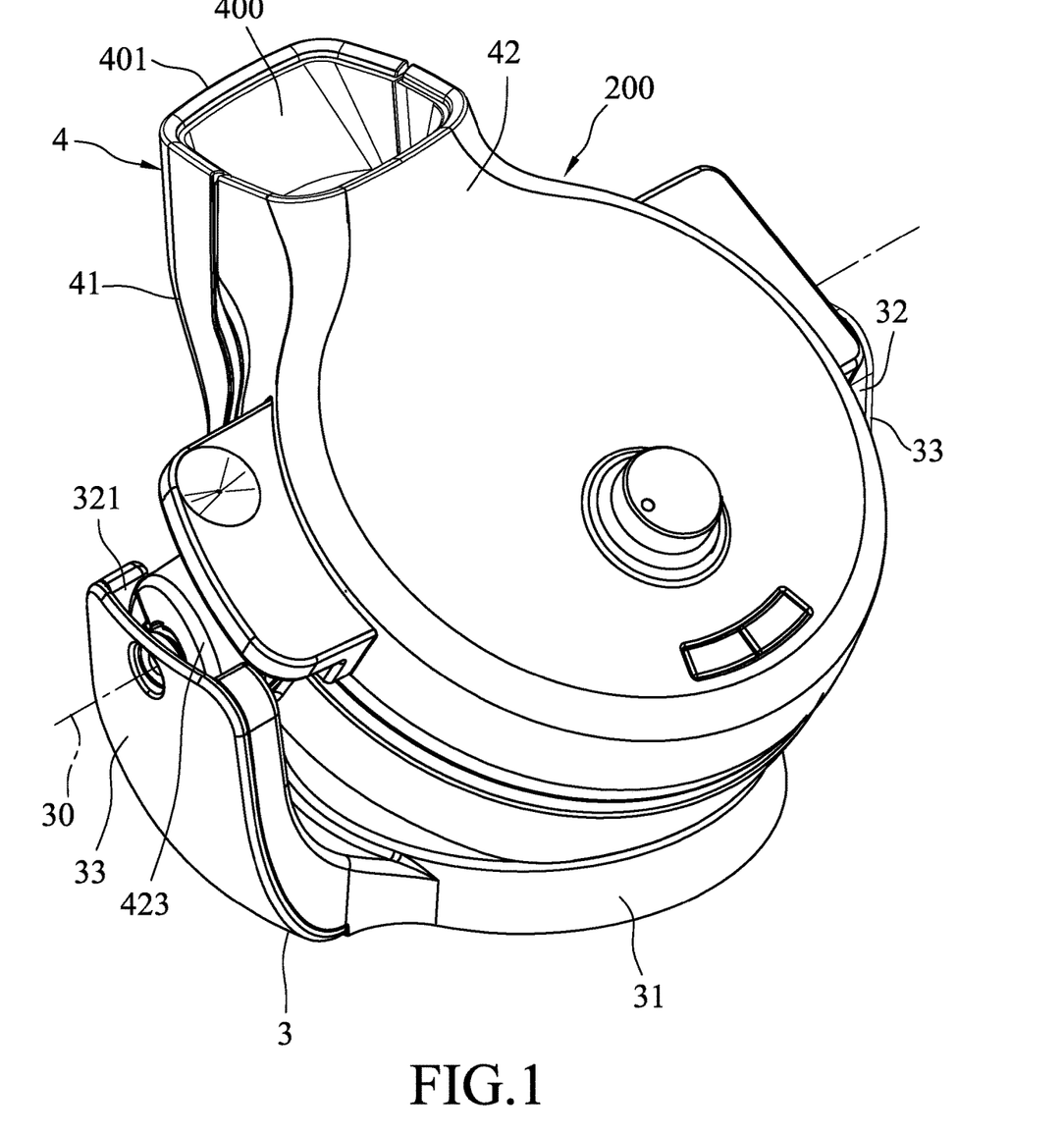
FIG. 1 is a perspective view of a first embodiment according to a grill device of the present disclosure.
Figure 2:
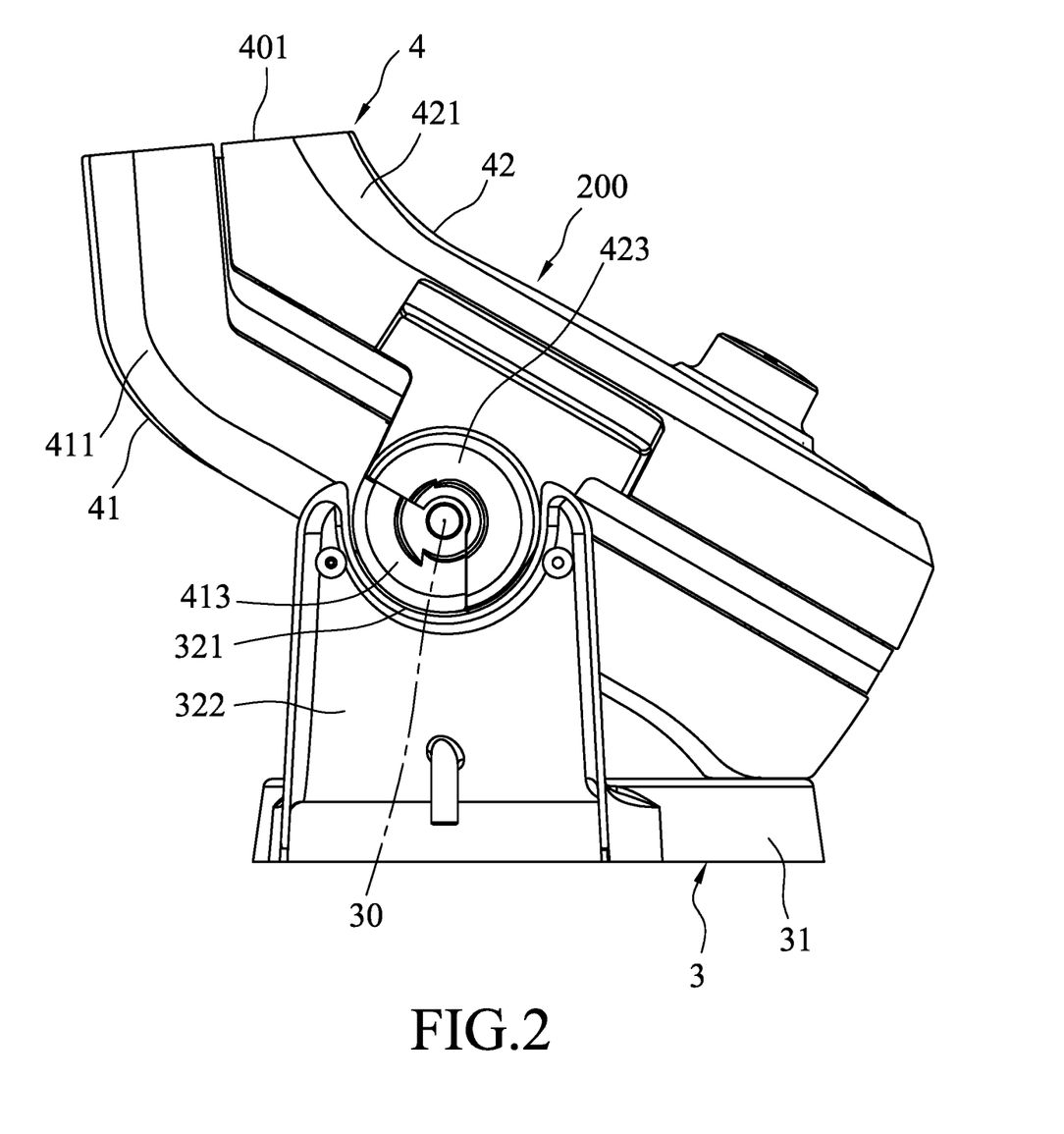
FIG. 2 is a schematic left side view of the first embodiment, illustrating the grill device being at a natural inclined position.
Figure 3:
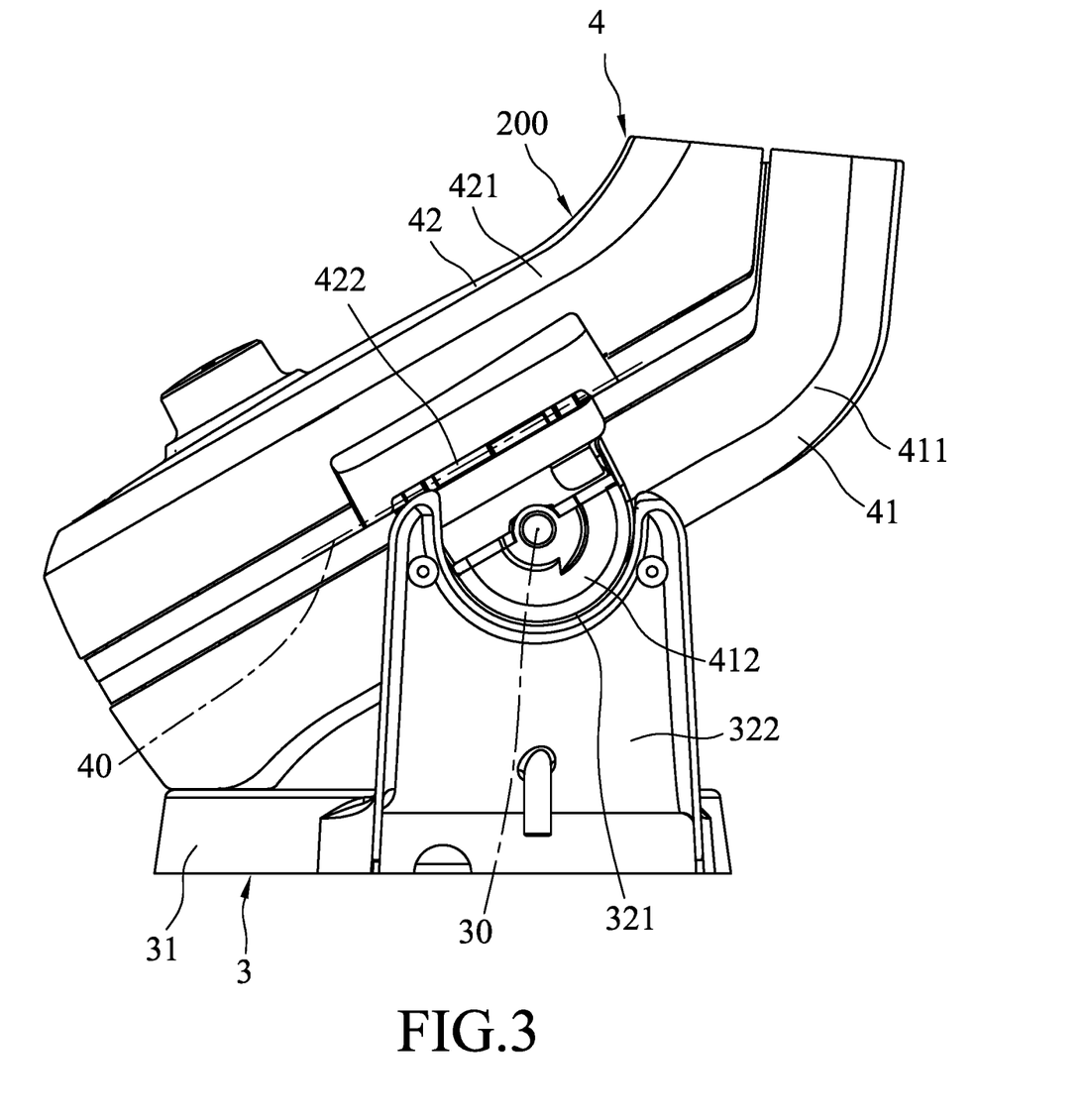
FIG. 3 is a schematic right side view of the first embodiment.

Referring to FIGS. 1 to 3, a first embodiment of a grill device 200 for making a waffle according to the present disclosure is shown. The grill device 200 is adapted for cooking a food material, e.g., a batter, and includes a support rack 3, and a grill module 4 mounted rotatably on the support rack 3 about a rotating axis 30.

The support rack 3 includes a bottom seat 31, two side walls 322, and two lateral covers 33. The side walls 322 extend vertically and respectively from lateral sides of the bottom seat 31 and respectively have two receiving grooves 321 cooperating with each other to constitute a receiving groove unit 32 open upwardly and having a semi-circular configuration. The lateral covers 33 respectively cover the side walls 322. Note that the lateral covers 33 are provided for decorative purpose and are not depicted in FIGS. 2-4 and 6 for better understanding of the structures of the grill module 4.

The grill module 4 is formed with a feed inlet 401 through which the food material to be cooked is fed, and includes a lower grill plate 41 and an upper grill plate 42. The upper grill plate 42 removably covers the lower grill plate 41, and is operable to uncover the lower grill plate 41.

Figure 4:
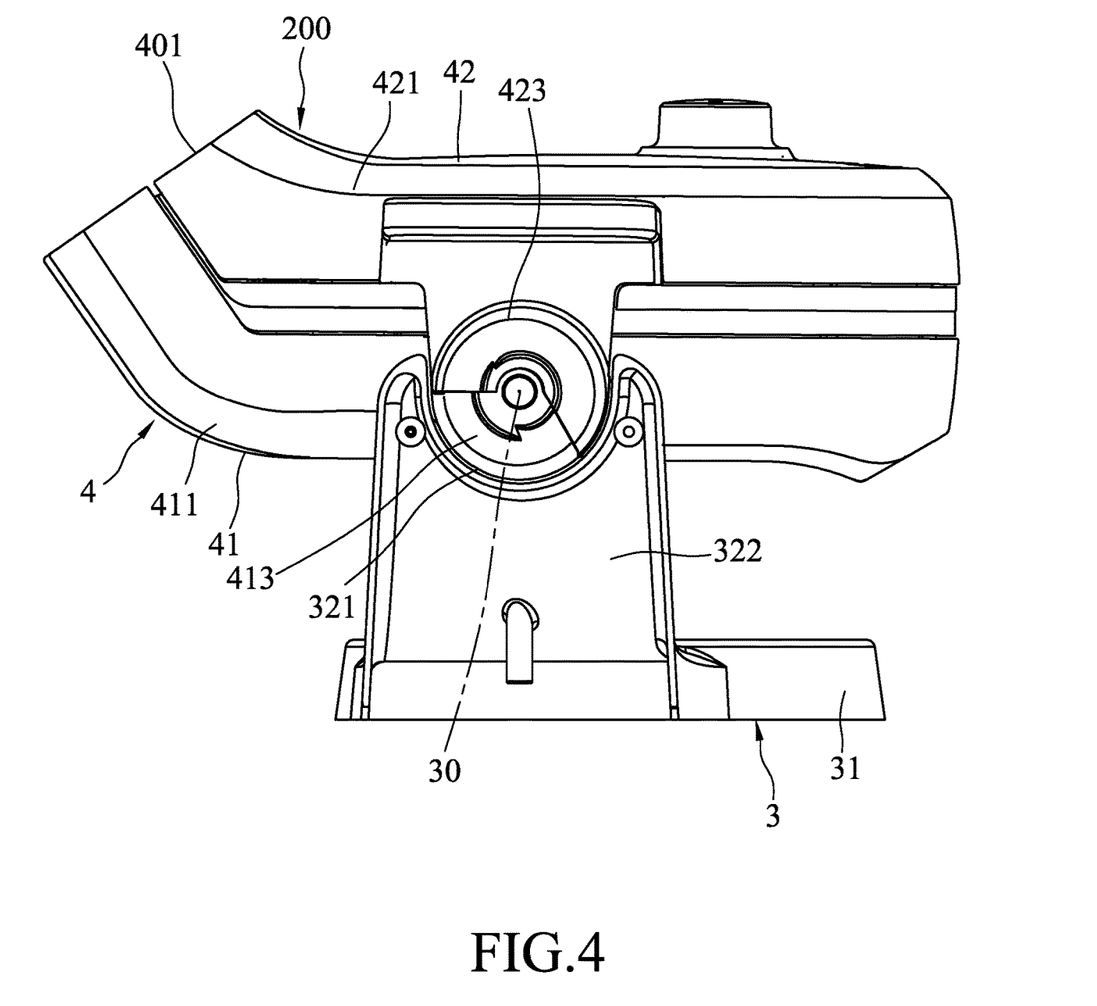
FIG. 4 is a schematic left side view of the first embodiment, illustrating the grill device being at a hand-held position.
Figure 5:
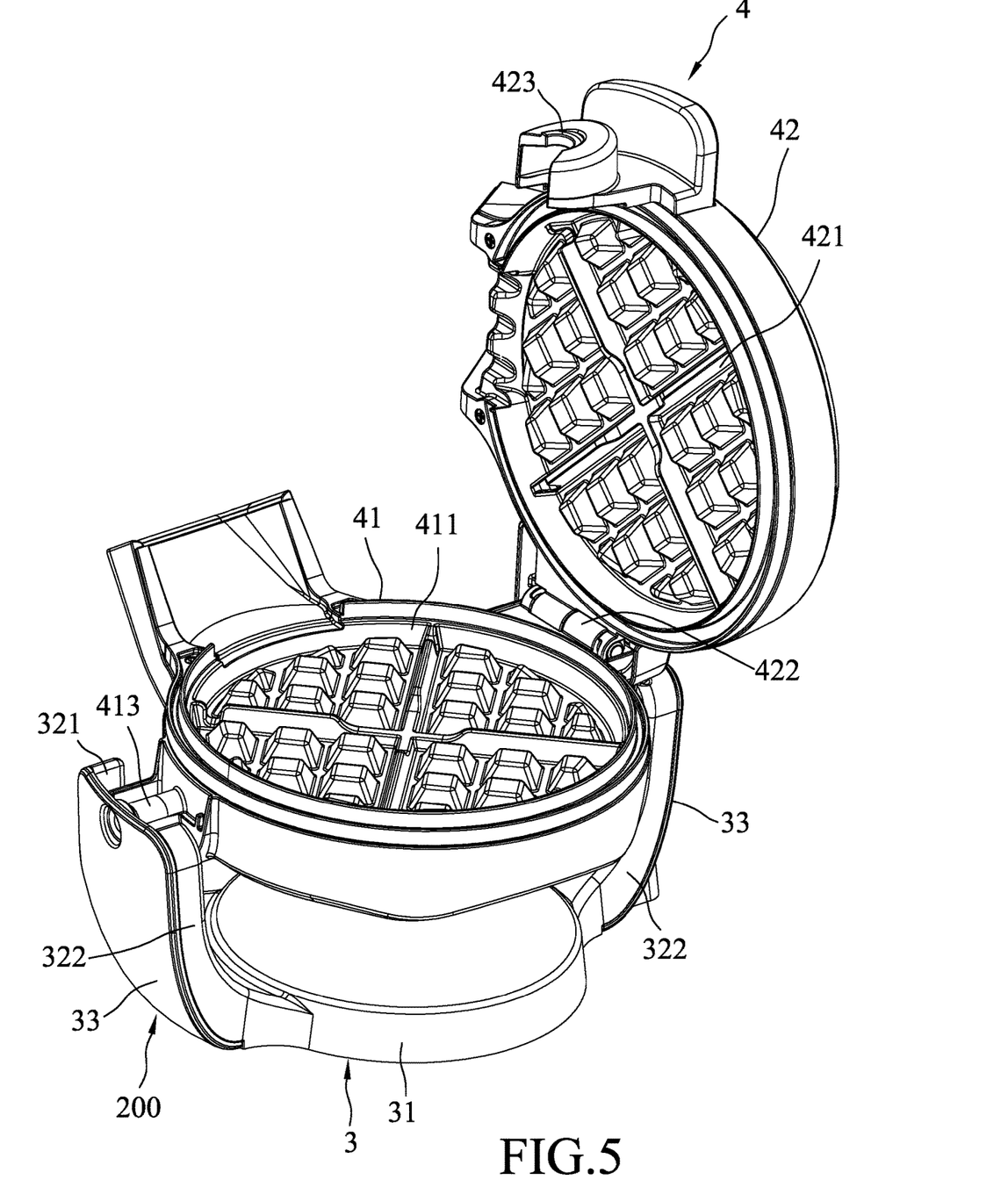
FIG. 5 is a schematic perspective view of the first embodiment, illustrating the grill device being at the hand-held position and including a lower grill plate and an upper grill plate being uncovered from the lower grill plate.

Further referring to FIGS. 4 and 5, the grill module 4 is rotatable relative to the support rack 3 between a natural inclined position (FIGS. 1-3) and a hand-held position (FIGS. 4 and 5). When the grill module 4 is at the natural inclined position, the feeding opening 401 and a gravity center of the grill module 4 are respectively located at two sides of the rotating axis 30, the gravity center is lower than the rotating axis 30 in height, and the upper grill plate 42 is locked on the lower grill plate 41 by the support rack 3 so as to cover the lower grill plate 41. In this embodiment, the feeding opening 401 and the gravity center of an assembly of the upper and lower grill plates 42, 41 are respectively located at two sides of the rotating axis 30. When the grill module 4 is at the hand-held position, the upper grill plate 42 is unlocked from the support rack 3 and is rotatable relative to the lower grill plate 41 so as to uncover the lower grill plate 41.

Specifically, the lower grill plate 41 includes a lower plate body 411, a rotating shaft portion 412 and a connecting shaft portion 413. The rotating shaft portion 412 and the connecting shaft portion 413 extend from the lower plate body 411 and away from each other along the rotating axis 30, and are supported rotatably and respectively in the receiving grooves 321 of the receiving groove unit 32 of the support rack 3. As respectively shown in FIGS. 3 and 2, in this embodiment, the rotating shaft portion 412 is a half cylinder disposed at a right side of the lower plate body 411 and the connecting shaft portion 413 is a cylindrical sector disposed at a left side of the lower plate body 411.

The upper grill plate 42 includes an upper plate body 421, a pivot connecting portion 422 and an engaging shaft portion 423. The upper plate body 421 is connected between the pivot connecting portion 422 and the engaging shaft portion 423 along the rotating axis 30. The lower plate body 411 cooperates with the upper plate body 421 to define a cooking space 400, which is in fluid communication with the feed inlet 401, therebetween when being covered by the upper plate body 421. The pivot connecting portion 422 is disposed at a right side of the upper plate body 421, is pivotable about a pivoting axis 40 (see FIG. 3) that is non-parallel to the rotating axis 30, and is pivotally connected to the lower grill plate 41 such that the upper grill plate 42 is pivotable relative to the lower grill plate 41.

The engaging shaft portion 423 is disposed at a left side of the upper plate body 421, is stacked on the connecting shaft portion 413, and a portion of the engaging shaft portion 423 is received in a left one of the receiving grooves 321 corresponding in position to the connecting shaft portion 413 such that the grill module 4 is rotatable relative to the support rack 3. In this embodiment, the engaging shaft portion 423 is a cylindrical sector and cooperates with the connecting shaft portion 413 to form a cylinder. Specifically, outer peripheries of the connecting shaft portion 413 and the engaging shaft portion 423 cooperate with each other to define an circle centered at the rotating axis 30. The outer periphery of the engaging shaft portion 423 has a circumferential length ranging from a half of the perimeter of the circle to two-thirds of the perimeter. In this embodiment, the circumferential length of the outer periphery of the engaging shaft portion 423 is two-thirds of the perimeter of the circle.

In this embodiment, the pivot connecting portion 422 is disposed proximate to the rotating shaft portion 412, is located above the rotating axis 30, and the pivoting axis 40 is transverse to the rotating axis 30. Note that the pivot connecting portion 422 and the feed inlet 401 are respectively located at two sides of the rotating axis 30. The configuration of the pivot connecting portion 422 is not limited to the examples described herein. In other embodiments, the pivoting axis 40 may be parallel to the rotating axis 30, and the pivot connecting portion 422 may be disposed at a position lower than the gravity center of the grill module 4.

To use the grill device 200 of the present disclosure, as illustrated in FIGS. 1-3, the upper plate body 421 is first operated to cover the lower plate body 411, and the grill module 4 is rotated relative to the support rack 3 to the natural inclined position. Then, the food material to be cooked is fed into the cooking space 400 through the feed inlet 401. At this time, the engaging shaft portion 423 abuts against the left one of the side walls 322 that corresponds in position to the engaging shaft portion 423 and is immovable from the receiving groove 321 of the left one of the side walls 322. Since the gravity center of the assembly of the upper and lower grill plates 42, 41 is lower than the rotating axis 30 and the engaging shaft portion 423 is immovable from the support rack 3, the grill module 4 can be maintained at the natural inclined position without operating any fastening means for locking the upper plate body 421 to the lower plate body 411. In this way, even if the food material received in the cooking space 400 is swelled as a result of being heated, the upper plate body 422 is still locked on the lower plate body 411 by the support rack 3 so that the food material would not leak out of the cooking space 400.

After cooking the food material is completed, the grill device 4 is operated to rotate relative to the support rack 3 to the hand-held position (see FIGS. 4 and 5) where the upper and lower grill plates 42, 41 are substantial parallel to the ground. At this time, the engaging shaft portion 423 is removable from the left one of the receiving grooves 321 to unlock the upper grill plate 42 from the support rack 3. Then, the upper grill plate 42 is operated to pivot relative to the lower grill plate 41 by the pivot connecting portion 422 to uncover the lower grill plate 41 so as to access the waffle thus made.

Figure 6:
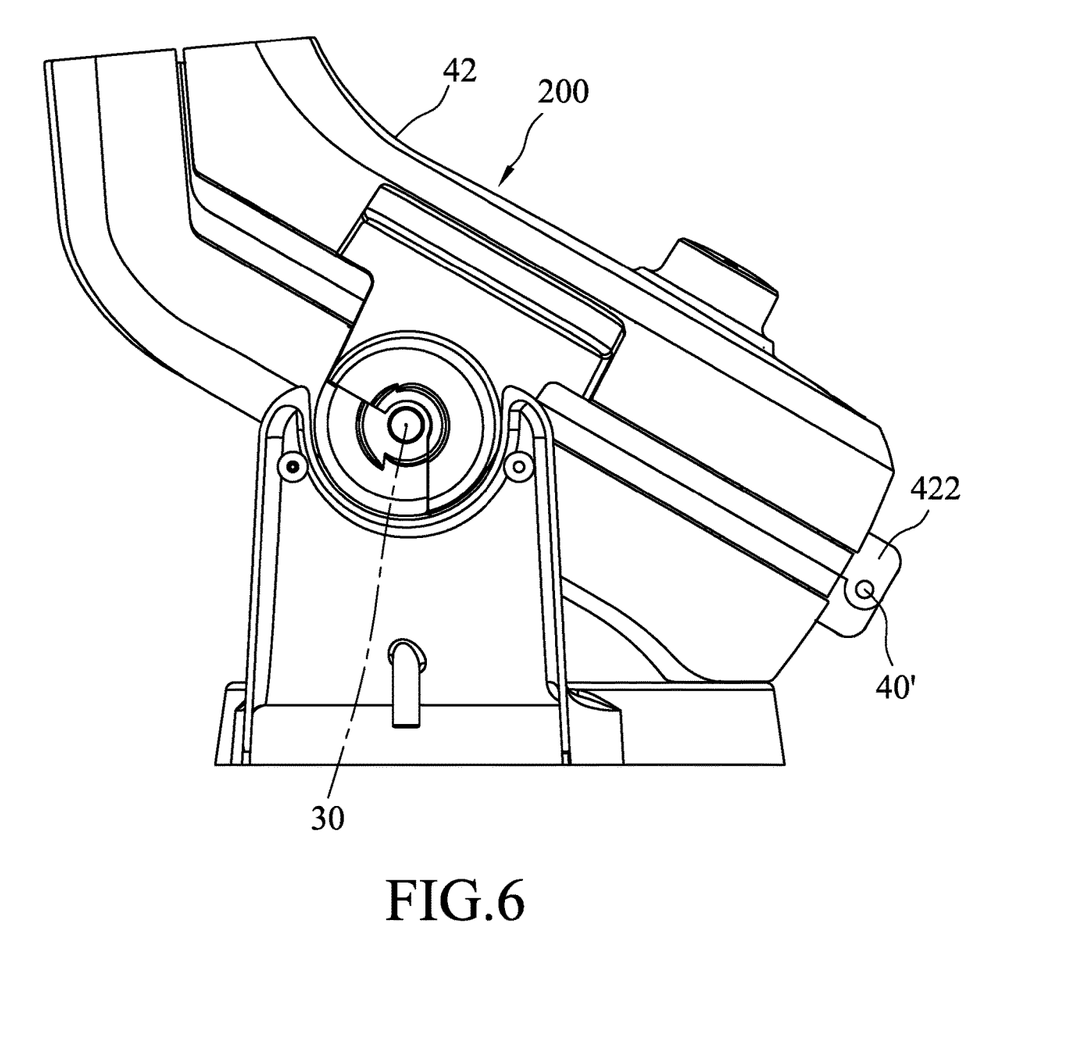
FIG. 6 is a schematic left side view of a second embodiment according to the grill device of the present disclosure, illustrating the grill device being at the natural inclined position.
Figure 7:
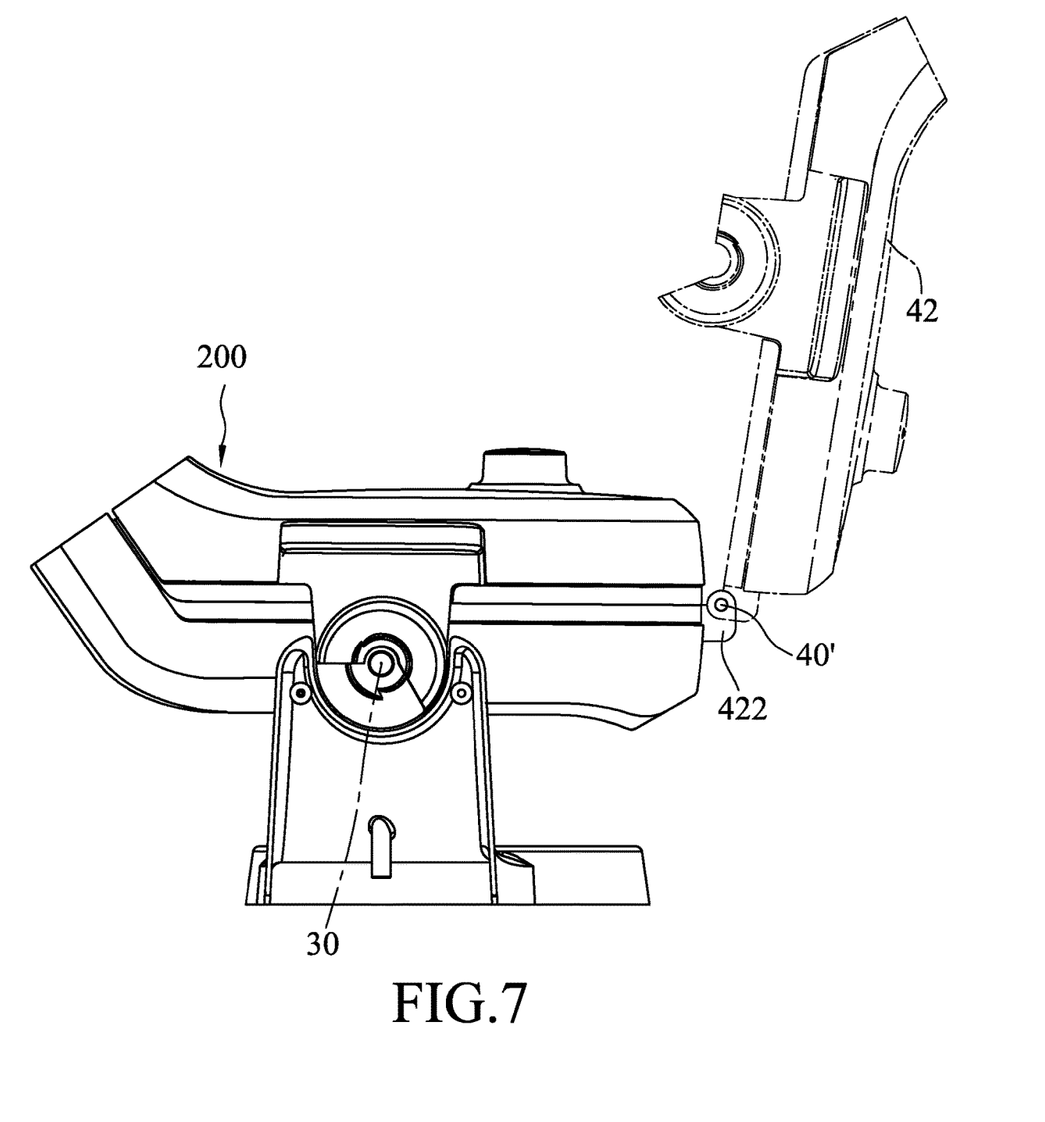
FIG. 7 is a schematic left side view of the second embodiment, illustrating the grill device being at the hand-held position and the upper grill plate being uncovered from the lower grill plate.

Referring to FIGS. 6 and 7, a second embodiment of the grill device 200 according to the present disclosure is shown. The second embodiment is similar to the first embodiment and the difference therebetween reside in the following. In the second embodiment, the pivot connecting portion 422 of the upper grill plate 42 is disposed at a lower side of the upper plate body 421 and is pivotable about a pivoting axis 40' parallel to the rotating axis 30. The second embodiment has the same advantages as those of the first embodiment.

To sum up, when the grill module 4 is at the natural inclined position, since the gravity center of the grill module 4 is lower than the rotating axis 30, and since the engaging shaft portion 423 of the upper grill plate 42 and the connecting shaft portion 413 of the lower grill plate 41 are locked within the receiving groove unit 32, the grill module 4 can be maintained at the natural inclined position without operating any fastening means, e.g., the clamping device described in the background section, for locking the upper plate body 421 to the lower plate body 11 so as to prevent the food material received in the cooking space 400 from leaking out of the cooking space 400. Thus, it is relatively simple to operate the grill device of the present disclosure to make waffles and the manufacturing cost of the present disclosure is relatively low as compared to the conventional grill device. Additionally, since the feed inlet 401 and the gravity center of the assembly of the upper and lower grill plates 42, 41 are respectively located at two sides of the rotating axis 30, the food material received in the cooking space 400 would not flow out of the cooking space 400 through the feeding opening 401 during cooking.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A grill device adapted for cooking a food material, said grill device comprising:
    a support rack, and
    a grill module mounted rotatably on said support rack about a rotating axis, formed with a feed inlet which is provided to fed the food material, and including a lower grill plate, and an upper grill plate operable to cover and uncover said lower grill plate,
    said grill module being rotatable relative to said support rack between a hand-held position and a natural inclined position,
    when said grill module is at the natural inclined position, said feed inlet and a gravity center of said grill module are respectively located at two sides of the rotating axis, the gravity center is lower than the rotating axis in height, and said upper grill plate is locked on said lower grill plate by said support rack so as to cover said lower grill plate,
    when said grill module is at the hand-held position, said upper grill plate is unlocked from said support rack and is rotatable relative to said lower grill plate so as to uncover said lower grill plate;
    wherein said lower grill plate includes a lower plate body and a connecting shaft portion, said connecting shaft portion extending from said lower plate body along the rotating axis and being supported rotatably by said support rack, said support rack being formed with a receiving groove unit opening upwardly and receiving said connecting shaft portion therein, said upper grill plate including an engaging shaft portion which is stacked on said connecting shaft portion and a portion of which is received in said receiving groove unit such that said grill module is rotatable relative to said support rack, said engaging shaft portion being immovable relative to said receiving groove unit when said grill module is at the natural inclined position.

2. The grill device as claimed in claim 1, wherein said lower grill plate includes a rotating shaft portion, said rotating shaft portion extending from said lower plate body and away from each other along the rotating axis and being supported rotatably by said support rack, said receiving groove unit receiving said rotating shaft portion therein,
    said upper grill plate including
        a pivot connecting portion which is pivotally connected to said lower grill plate such that said upper grill plate is pivotable relative to said lower grill plate.

3. The grill device as claimed in claim 2, wherein said support rack includes two side walls extending vertically and respectively having two receiving groove cooperating with each other to constitute said receiving groove unit, outer peripheries of said connecting shaft portion and said engaging shaft portion cooperating with each other to define a circle centered at the rotating axis, said outer periphery of said engaging shaft portion having a circumferential length ranging from a half of the perimeter of the circle to two-thirds of the perimeter, said engaging shaft portion abutting against one of said side walls that corresponds in position to said engaging shaft portion and being immovable from said receiving groove of said one of said side walls when said grill module is in the natural inclined position.

4. The grill device as claimed in claim 2, wherein said rotating shaft portion is a half cylinder, said engaging shaft portion is a cylindrical sector, and said connecting shaft portion is a cylindrical sector cooperating with said engaging shaft portion to form a cylinder.

5. The grill device as claimed in claim 2, wherein said pivot connecting portion of said upper grill plate is pivotable about a pivoting axis that is non-parallel to the rotating axis.

6. The grill device as claimed in claim 5, wherein said upper grill plate further includes an upper plate body connected between said pivot connecting portion and said engaging shaft portion along the rotating axis, said pivot connecting portion being disposed proximate to said rotating shaft portion.

7. The grill device as claimed in claim 5, wherein said pivoting axis is transverse to said rotating axis.

8. The grill device as claimed in claim 2, wherein said pivot connecting portion of said upper grill plate is pivotable about a pivoting axis that is parallel to the rotating axis.

9. The grill device as claimed in claim 8, wherein said pivot connecting portion and said feed inlet are respectively located at two sides of the rotating axis.

* * * * *